(12) United States Patent
Kiyokawa

(10) Patent No.: US 10,797,388 B2
(45) Date of Patent: Oct. 6, 2020

(54) VEHICLE-MOUNTED ANTENNA DEVICE

(71) Applicant: HARADA INDUSTRY CO., LTD., Tokyo (JP)

(72) Inventor: Hajime Kiyokawa, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 16 days.

(21) Appl. No.: 16/343,999

(22) PCT Filed: Oct. 10, 2017

(86) PCT No.: PCT/JP2017/036684
§ 371 (c)(1),
(2) Date: Apr. 22, 2019

(87) PCT Pub. No.: WO2018/079250
PCT Pub. Date: May 3, 2018

(65) Prior Publication Data
US 2019/0237866 A1      Aug. 1, 2019

(30) Foreign Application Priority Data

Oct. 28, 2016   (JP) ................................. 2016-211622

(51) Int. Cl.
*H01Q 1/32*       (2006.01)
*H01Q 1/52*       (2006.01)
(Continued)

(52) U.S. Cl.
CPC ............. *H01Q 1/526* (2013.01); *B60R 11/04* (2013.01); *G03B 15/00* (2013.01); *H01Q 1/22* (2013.01);
(Continued)

(58) Field of Classification Search
None
See application file for complete search history.

(56) References Cited

U.S. PATENT DOCUMENTS 8,422,247 B2 *   4/2013   Kameyama ........ H01R 13/6582
                                                              361/799
2007/0182649 A1    8/2007   Kondou
(Continued)

FOREIGN PATENT DOCUMENTS

JP    2007-208171 A    8/2007
JP    2007-208859 A    8/2007
(Continued)

OTHER PUBLICATIONS

International Search Report in PCT/JP2017/036684 dated Dec. 5, 2017.
(Continued)

*Primary Examiner* — Anh Q Tran
(74) *Attorney, Agent, or Firm* — Global IP Counselors, LLP

(57) ABSTRACT

A vehicle-mounted antenna device includes an antenna, an electronic component, a coaxial cable and a shielding member. The electronic component is electrically isolated from the antenna. The electronic component has a coaxial connector including an inner terminal and an outer terminal. The coaxial cable has one end connected to the coaxial connector. The shielding member is grounded to a vehicle body being ground. The shielding member is configured to block at least part of noise generated from the electronic component from reaching the antenna. The coaxial cable includes an inner conductor connected to the inner terminal and an outer conductor connected to the outer terminal. The electronic component is electrically connected to the shielding member via only the outer terminal.

10 Claims, 12 Drawing Sheets

(51) Int. Cl.
    *B60R 11/04*    (2006.01)
    *H01Q 1/22*     (2006.01)
    *H01Q 1/48*     (2006.01)
    *G03B 15/00*    (2006.01)

(52) U.S. Cl.
    CPC .............. *H01Q 1/32* (2013.01); *H01Q 1/48* (2013.01); *H01Q 1/52* (2013.01)

(56) References Cited

U.S. PATENT DOCUMENTS

| | | |
|---|---|---|
| 2011/0096524 A1 | 4/2011 | Kameyama |
| 2012/0256798 A1 | 10/2012 | Paulus et al. |
| 2017/0033449 A1* | 2/2017 | Talty ..................... H01Q 21/28 |
| 2018/0076514 A1* | 3/2018 | Nugent .................. H01Q 5/371 |

FOREIGN PATENT DOCUMENTS

| | | | |
|---|---|---|---|
| JP | 2014-150496 A | 8/2014 | |
| WO | 2009142276 A1 | 11/2009 | |
| WO | 2011077142 A1 | 6/2011 | |
| WO | 2016093084 A1 | 6/2016 | |
| WO | WO-2016093084 A1 * | 6/2016 | .............. H01Q 1/32 |

OTHER PUBLICATIONS

International Preliminary Report on Patentability, dated May 9, 2019.

\* cited by examiner

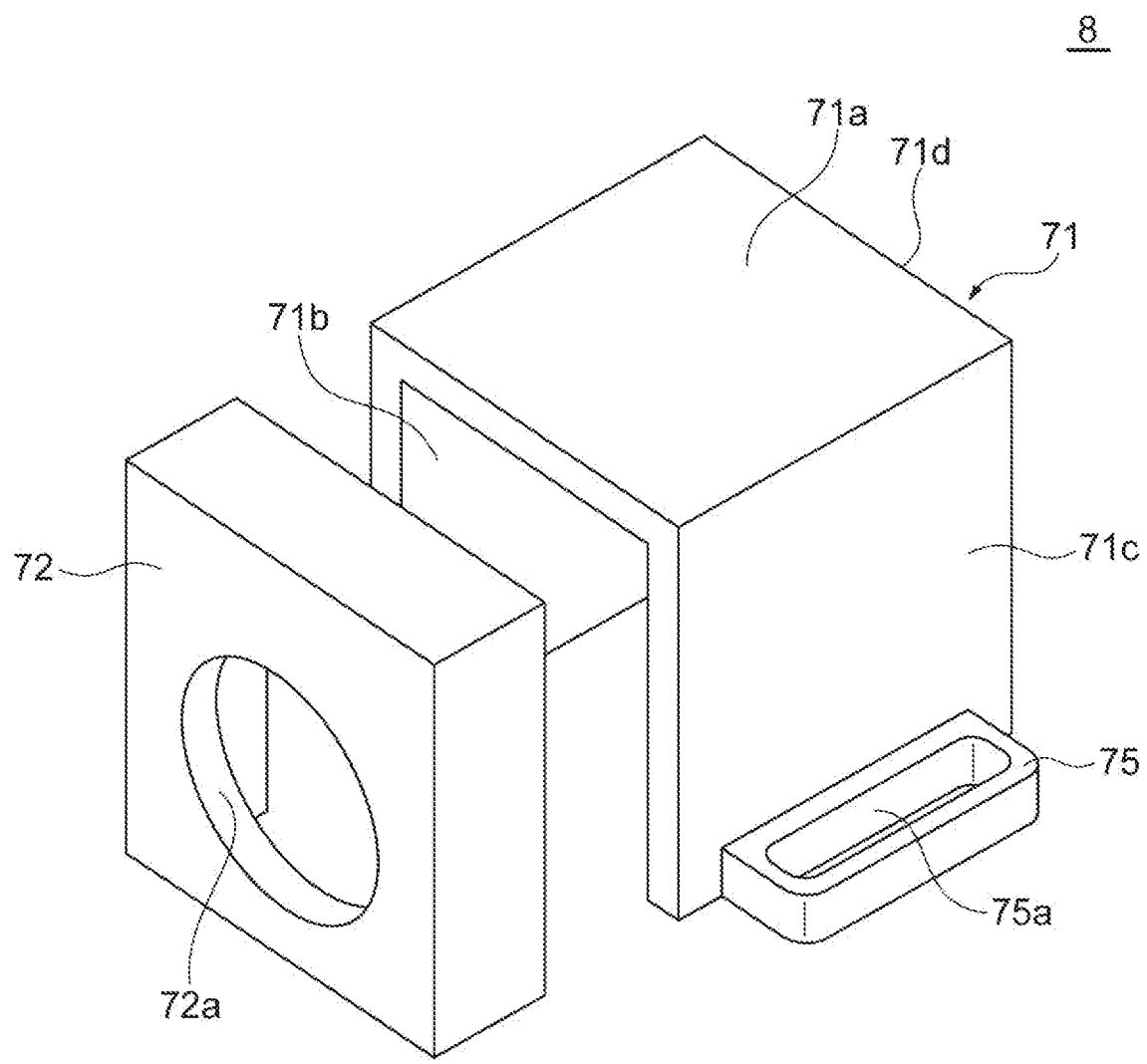

FREQUENCY(Hz)

FREQUENCY(Hz)

VEHICLE-MOUNTED ANTENNA DEVICE

TECHNICAL FIELD

The present invention relates to a vehicle-mounted antenna device.

BACKGROUND ART

A Vehicle such as a passenger car may be mounted with a camera for checking the surroundings of the vehicle. Patent Literature 1 below describes an example in which a camera as described above is provided in a vehicle-mounted antenna device mounted on a roof panel of a vehicle.

CITATION LIST

Patent Literature

Patent Literature 1: Japanese Unexamined Patent Publication No. 2014-150496

SUMMARY OF INVENTION

Technical Problem

An electronic component like the above-described cameras is electrically isolated from an antenna within a vehicle-mounted antenna device and independently operates regardless of transmission or reception of the antenna. If such an electronic component is mounted on the vehicle-mounted antenna device, noise generated from the electronic component may degrade the performance of the antenna. In order to prevent the performance of the antenna from degrading due to the electronic component, it is conceivable, for example, to provide a shielding member around the electronic component. However, only providing the shielding member may not be able to sufficiently reduce performance degradation of the antenna.

An object of one form of the present invention is to provide a vehicle-mounted antenna device capable of sufficiently reducing performance degradation of an antenna even when an electronic component is mounted.

Solution to Problem

A vehicle-mounted antenna device according to one aspect of the present invention is a vehicle-mounted antenna device including an antenna, the vehicle-mounted antenna device comprising: an electronic component electrically isolated from the antenna and including a coaxial connector including an inner terminal and an outer terminal; a coaxial cable with one end connected to the coaxial connector; and a shielding member grounded to a vehicle body being ground, and configured to block at least part of noise generated from the electronic component from reaching the antenna, wherein the coaxial cable includes an inner conductor connected to the inner terminal and an outer conductor connected to the outer terminal, and the electronic component is electrically connected to the shielding member via only the outer terminal.

According to the vehicle-mounted antenna device, the shielding member is provided to block at least part of noise generated from the electronic component from reaching the antenna. Thereby, it is possible to prevent at least part of the noise generated from the electronic component from directly reaching the antenna. The electronic component is electrically connected to the shielding member grounded to the vehicle body which is the ground, via only the outer terminal. Consequently, the balanced state of the electronic component is well maintained, and the waveform of a differential signal is less likely to be disturbed, so that the electronic component is less likely to generate noise. In addition, one end of the coaxial cable is connected to the coaxial connector of the electronic component, and the outer conductor of the coaxial cable is connected to the outer terminal of the coaxial connector. Therefore, the outer conductor at the one end side of the coaxial cable is also electrically connected to the shielding member. Consequently, electric potential of the outer conductor at the one end of the coaxial cable is less likely to fluctuate due to operation of the electronic component, so that noise generated from the electronic component is less likely to transmit to the coaxial cable and noise is less likely to be radiated from the coaxial cable. Thereby, it is also possible to prevent noise via the coaxial cable from reaching the antenna. Thus, according to the above vehicle-mounted antenna device, it is possible to reduce an amount of noise generated from the electronic component and also favorably block the noise generated from the electronic component from reaching the antenna, so that it is possible to sufficiently reduce performance degradation of the antenna even if the electronic component is mounted.

The above vehicle-mounted antenna device may further comprise an antenna base configured to function as the ground for the antenna, and the shielding member and antenna base may be electrically connected to each other. In this case, the shielding member can be easily grounded via the antenna base. Since the outer conductor at the one end of the coaxial cable can be grounded in the vicinity of the electronic component, the electric potential of the outer conductor at the one end can be stabilized more. Furthermore, since both ends of the coaxial cable can be grounded, the electric potential of the entire outer conductor is stabilized and generation of noise due to the coaxial cable can be reduced.

The above vehicle-mounted antenna device may further comprise a fixing member configured to fix the shielding member to the antenna base, and the shielding member may be electrically connected to the antenna base via the fixing member. In this case, both fixing of the shielding member to the antenna base and grounding of the shielding member via the antenna base can be performed with only the fixing member.

The shielding member may have a portion located between the electronic component and antenna. Thereby, the noise blocking effect by the shielding member can be obtained well.

The electronic component is a camera including an optical section including a lens and a body where the coaxial connector and optical section are provided, the shielding member is provided in such a way as to cover at least the body and may have an opening for exposing the lens. In this case, the shielding member can favorably block noise generated from the electronic component without disturbing photographing with the camera which is the electronic component.

Advantageous Effects of Invention

According to one form of the present invention, it is possible to provide a vehicle-mounted antenna device capable of sufficiently reducing performance degradation of an antenna even when an electronic component is mounted.

BRIEF DESCRIPTION OF DRAWINGS

FIG. 5 is an exploded perspective view of a shielding member.

DESCRIPTION OF EMBODIMENTS

Hereinafter, a preferred embodiment of the present invention will be described in detail with reference to the accompanying drawings. In the following description, the same reference signs will be used for the same elements or elements having the same functions and redundant description will be omitted.

Figure 1A:
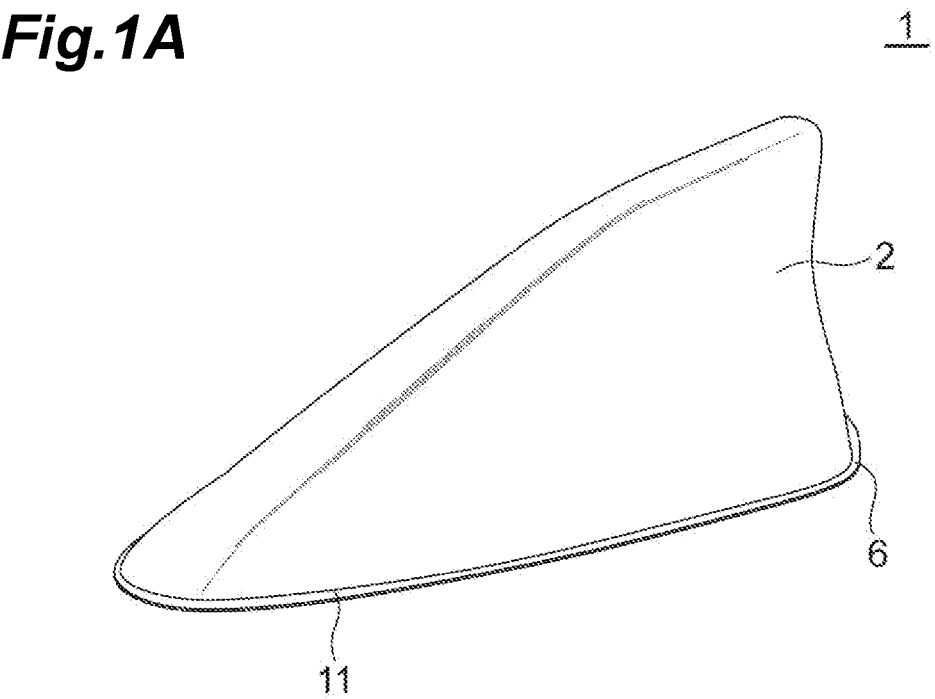
FIG. 1A is a perspective view of an antenna device according to an embodiment.
Figure 1B:
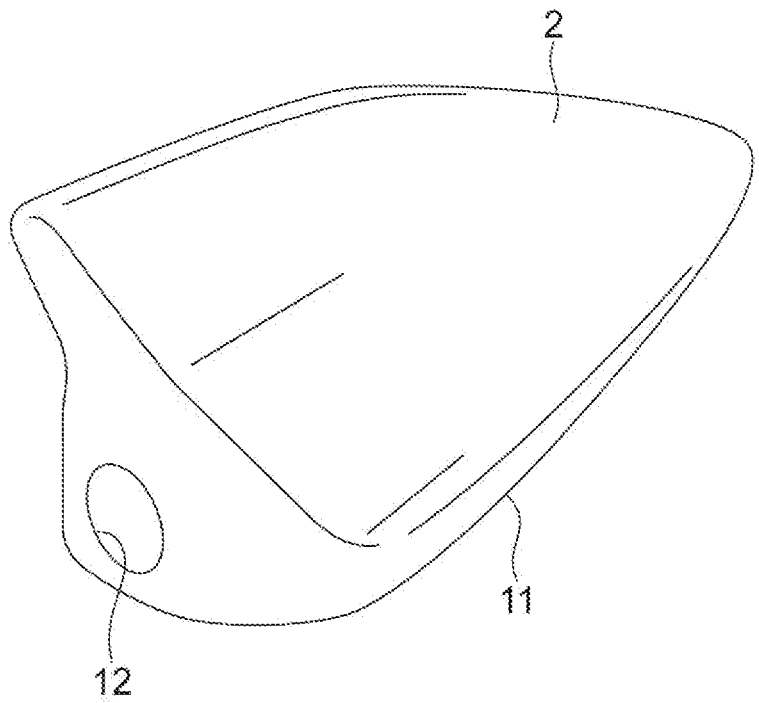
FIG. 1B is a rear side perspective view of a cover.
Figure 2:
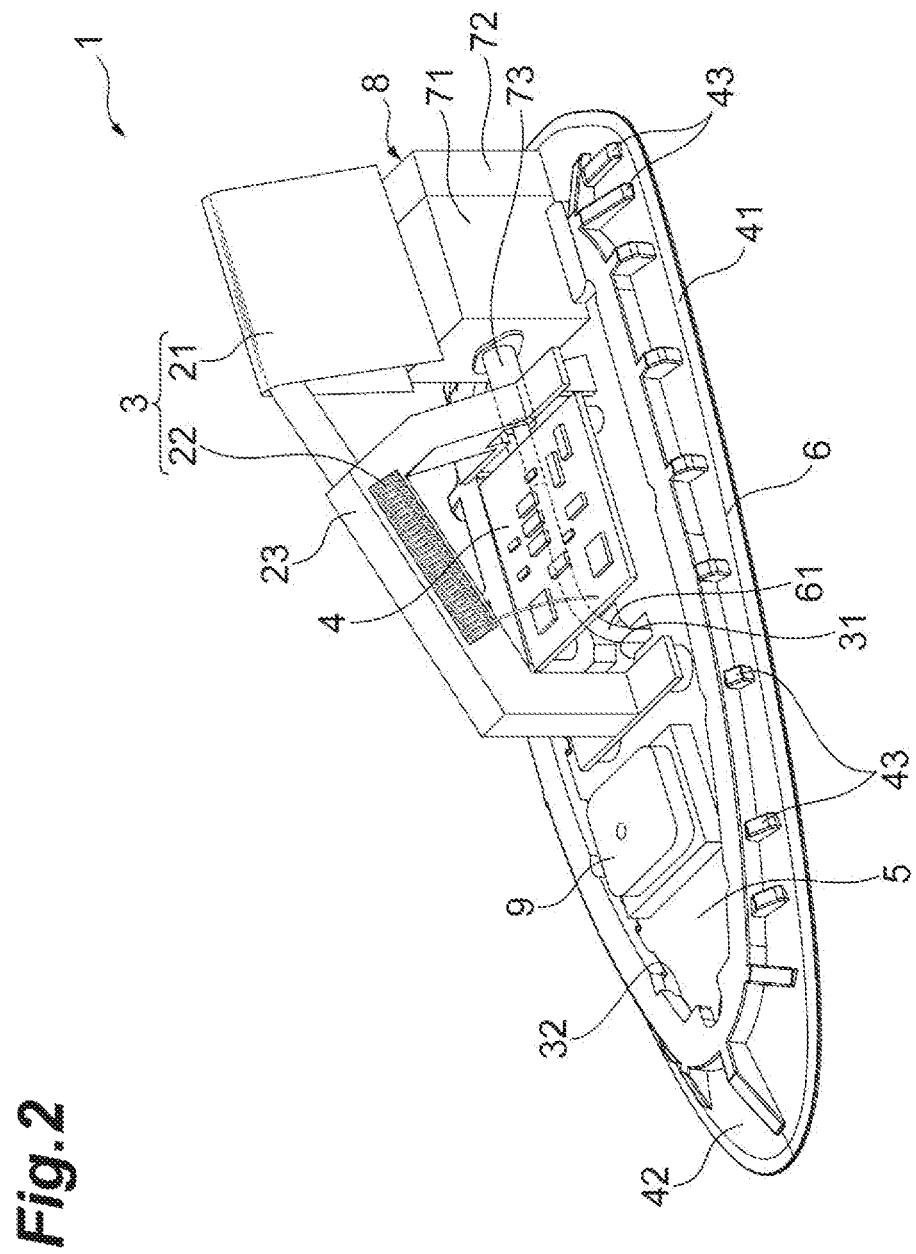
FIG. 2 is a schematic perspective view illustrating the inside of the antenna device according to the embodiment.

FIG. 1A is a perspective view of an antenna device according to the present embodiment and FIG. 1B is a rear side perspective view of a cover. FIG. 2 is a schematic perspective view illustrating the inside of the antenna device according to the present embodiment. An antenna device 1 shown in FIG. 1A, FIG. 1B and FIG. 2 is a vehicle-mounted antenna device mounted on a roof of a vehicle. The antenna device 1 includes a cover 2, an antenna 3, circuit board 4, a base 5, a pad 6, an electronic component 7 (see FIG. 4A and FIG. 4B), and a shielding member 8. In the following description, in the antenna device 1 and components constituting the antenna device 1, a forward direction of the vehicle is regarded as a front end side and rearward direction of the vehicle is regarded as a rear end side. In the antenna device 1 and the components constituting the antenna device 1, a side attached to the vehicle is regarded as a lower side. In the following, a longitudinal direction of the vehicle is simply referred to as a "longitudinal direction," a vertical direction of the vehicle is simply referred to as a "vertical direction," and a width direction of the vehicle is simply referred to as a "width direction."

The cover 2 is a protective member that covers at least the antenna 3, circuit board 4, base 5, electronic component 7, and shielding member 8, and is made of, for example, a resin that transmits radio waves. The cover 2 has a streamline shape (shark fin shape) whose height gradually decreases from its rear end side to the front end side. Distance between side surfaces of the cover 2 is substantially constant from its upper end to the vicinity of the center and gradually increases from the vicinity of the center to the lower end. The cover 2 is attached to the base 5 by using, for example, a plurality of screws. An edge 11 of the cover 2 is in contact with the pad 6. An opening 12 is provided at the rear end of the cover 2. Therefore, at least part of the inside of the cover 2 is visible from the outside of the cover 2 via the opening 12.

The antenna 3 includes a first antenna 21 and a second antenna 22, and is fixed onto the base 5 by an antenna stand 23 made of, for example, an insulating resin. The first antenna 21 and second antenna 22 are composed of a conductive material such as metal, alloy, or conductive resin, and transmit and receive signals, for example, in the AM wave band and FM wave band. The first antenna 21 is mounted at the upper end side of the antenna stand 23. By disposing the first antenna 21 at a high position like this, transmission and reception characteristics of the first antenna 21 can be improved. The second antenna 22 is provided on the antenna stand 23. The second antenna 22 is formed in a coil, its one end is connected to the first antenna 21, and its other end is connected to the circuit board 4.

The circuit board 4 is fixed to the base 5 and accepts a signal received by the antenna 3. The circuit board 4 is provided with, for example, an integrated circuit and a capacitor, and performs amplification or the like of the signal received by the antenna 3. The circuit board 4 and first antenna 21 may not overlap with each other in a plan view. Thereby, the reception performance of the antenna 3 can be improved. The circuit board 4 is connected to cable or the like which is not shown, and the circuit board 4 is electrically connected to an electronic device in the vehicle via the cable or the like.

The base 5 is, for example, a mount made of metal or alloy, and is a member grounded to a vehicle body which is ground. In other words, the base 5 is a member (antenna base) that functions as ground for the antenna 3. The base 5 has, for example, a substantially oval shape or substantially elliptic shape in a plan view, and has a size that fits in the edge 11 of the cover 2. An opening 31 is formed at a middle portion of the base 5. For example, the cable connected to the circuit board 4 is inserted into the opening 31. The base 5 is provided with a plurality of screw holes allowing screws that fix, for example, the vehicle, cover 2, and antenna 3 to be screwed to them.

A patch antenna 9 is provided on the base 5 at the front end side than the antenna 3. The patch antenna 9 transmits and receives radio waves used for, for example, GPS or ETC. That is, the patch antenna 9 transmits and receives radio waves different from the first antenna 21. The patch antenna 9 is electrically connected to the circuit board 4 or electronic device in the vehicle via, for example, an unshown cable.

The pad 6 is made of, for example, a flexible resin (such as rubber) and is a member in contact with the surface of the vehicle in the antenna device 1. The pad 6 is attached to the base 5 to cover and support an edge 32 of the base 5 and has a size located between the vehicle and cover 2. In particular, as shown in FIG. 1, an edge 41 of the pad 6 is located outside the cover 2, and the pad 6 and the edge 11 of the cover 2 are in close contact with each other. Thereby, infiltration of water into an internal space of the cover 2 from between the pad 6 and the edge 11 of the cover 2 is prevented. A large number of ribs 43 are provided on a surface 42 at the antenna 3 side of the pad 6.

Figure 3:
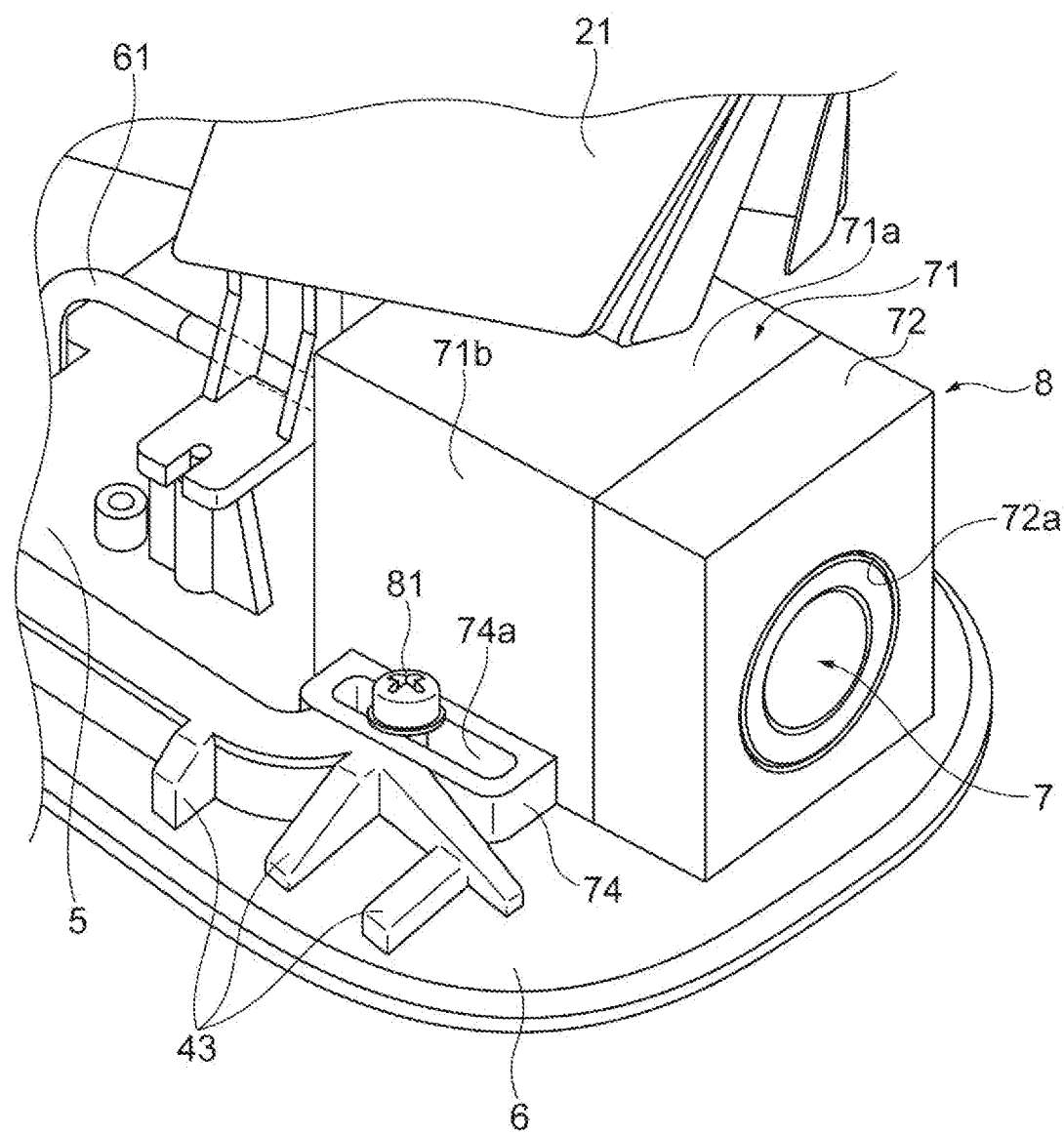
FIG. 3 is an enlarged perspective view of a part of the inside of the antenna device.
Figure 4A:
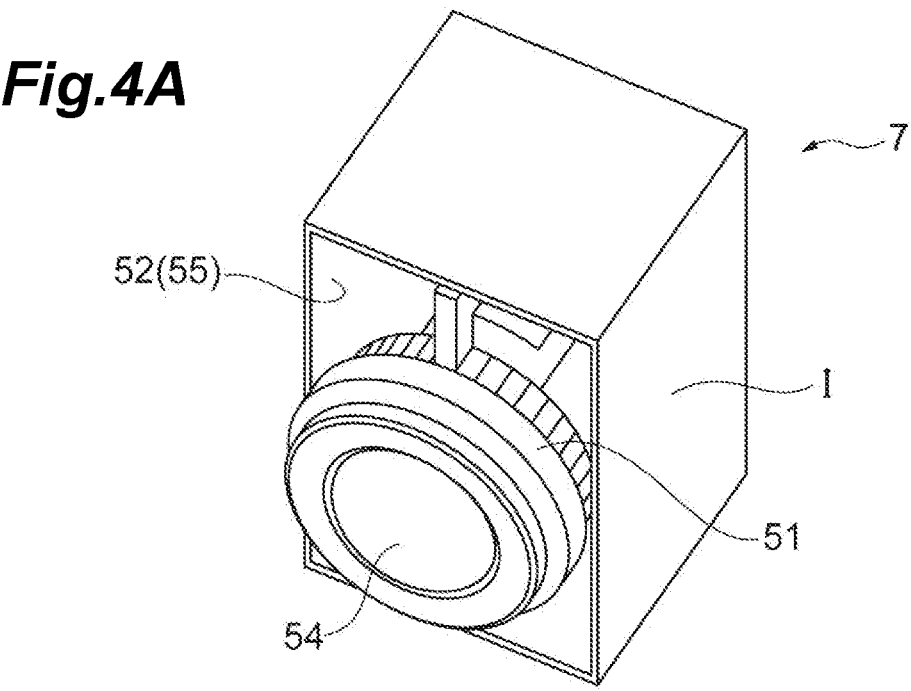
FIG. 4A is a front side perspective view of an electronic component.
Figure 4B:
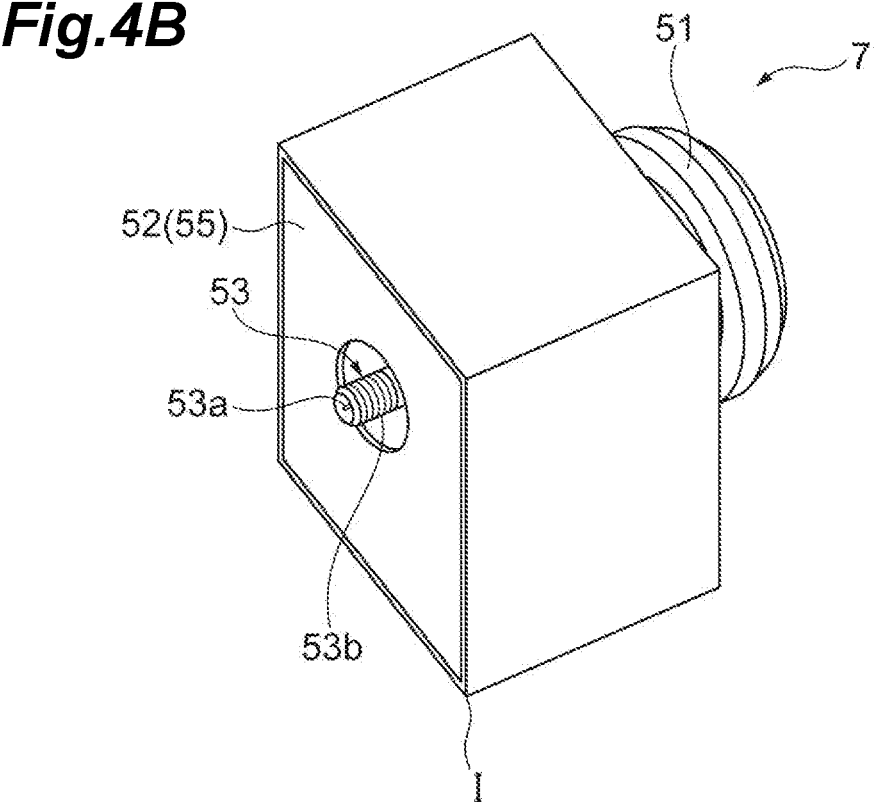
FIG. 4B is a rear side perspective view of the electronic component.
Figure 6:
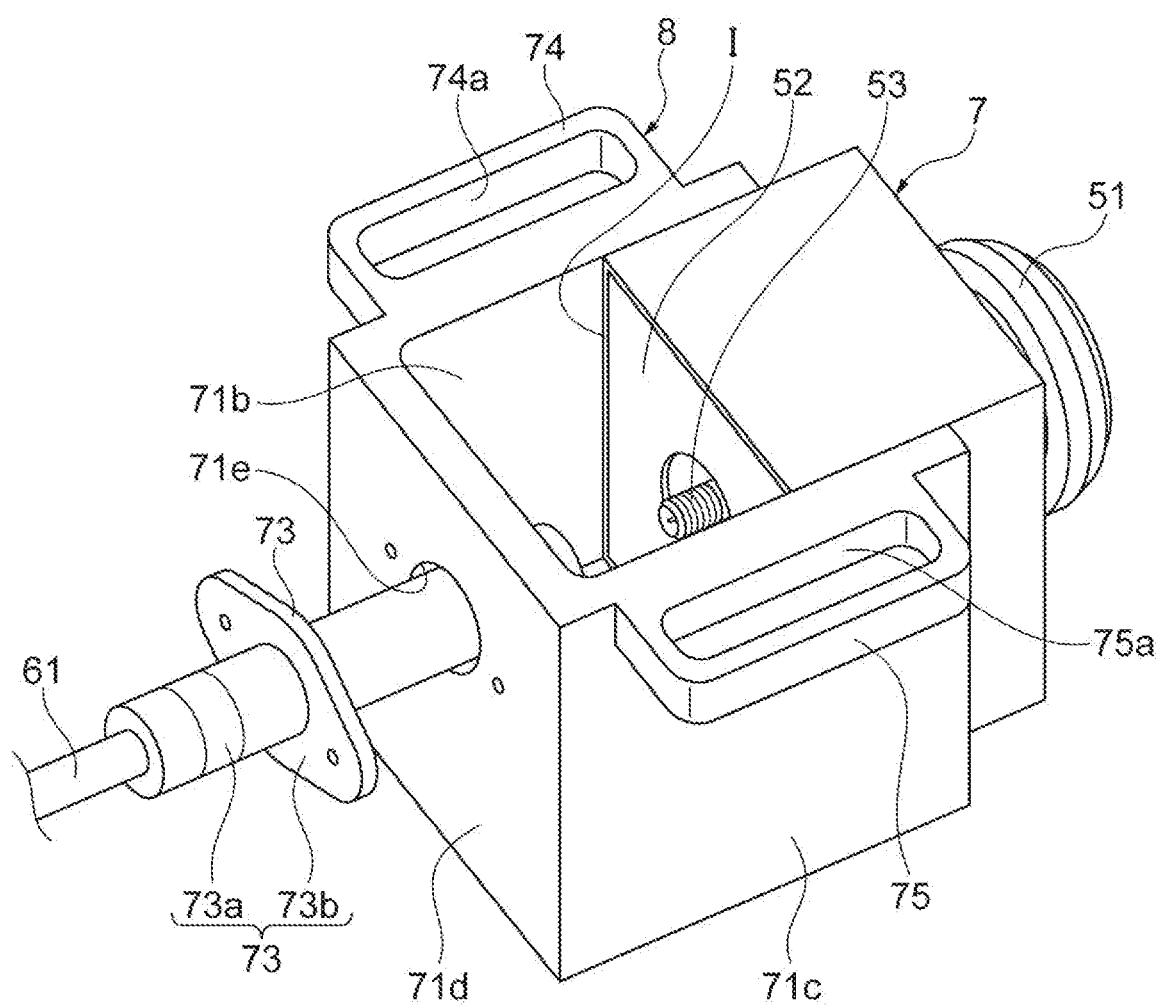
FIG. 6 is a diagram illustrating connection relation between the electronic component and shielding member.

Next, the electronic component 7 and shielding member 8 of the present embodiment will be described with reference to FIGS. 3 to 6 in addition to FIG. 2. FIG. 3 is an enlarged perspective view of a part of the inside of the antenna device 1. FIG. 4A is a front side perspective view of the electronic component 7 and FIG. 4B is a rear side perspective view of the electronic component 7. FIG. 5 is an exploded perspective view of the shielding member 8. FIG. 6 is a diagram illustrating connection relation between the electronic component 7 and shielding member 8. In FIG. 3, the circuit board 4 is omitted.

The electronic component 7 shown in FIGS. 3 and 4 is a member not involved in transmission and reception of radio waves by the antenna 3, circuit board 4, and the like, and is provided electrically isolated from the antenna 3. The electronic component 7 is provided on the rear side of the antenna device 1. Specifically, the electronic component 7 is provided on the base 5 and pad 6 and below the first antenna 21 in the antenna device 1. The electronic component 7 in the present embodiment is a camera (digital transmission camera) including an optical section 51, a body 52, and a connector 53. When the antenna device 1 is mounted on the vehicle, the electronic component 7 is provided so as to photograph backward of the vehicle. The electronic component 7 may generate noise while the camera which is the electronic component 7 is operating.

The optical section 51 is an optical system that forms a subject image, and is a portion that guides external light into the body 52. The optical section 51 includes a lens 54, a driving device for adjusting the position of the lens 54, and the like, and is provided in such a way as to protrude from the body 52. The optical section 51 is provided in such a way as to face the backward side in the antenna device 1 in order to photograph backward of the vehicle as described above. For this reason, at least the lens 54 in the optical section 51 is provided in such a way as to be exposed at the opening 12 of the cover 2 (see FIG. 1B), and to be visible from outside the antenna device 1. The state in which the lens 54 is exposed from the cover 2 is a state in which at least the lens 54 in the electronic component 7 is visible from outside the cover 2. The opening 12 of the cover 2 may be provided in such a way as not to obstruct a photographing range of the electronic component 7.

The body 52 is a portion that photoelectrically converts light incident from the optical section 51 and includes a housing 55 and components housed in the housing 55 such as an imaging element, an integrated circuit, and a balanced/unbalanced conversion circuit. The housing 55 has a substantially rectangular parallelepiped shape and at least part of its surface is made of metal or alloy. The surface of the housing 55 may have a function to block noise generated inside the body 52. In this case, the surface of the housing 55 may correspond to ground of an integrated circuit which is a balanced circuit.

Four faces of the surface of the housing 55 other than a face where the optical section 51 is provided and a face where the connector 53 is provided are covered with an insulator I. The insulator I is a filmy member that inhibits the housing 55 and shielding member 8 from being in direct contact with each other. Examples of the insulator I include an insulating sheet or insulating tape.

The connector 53 is a connector for electrically connecting the electronic component 7 and the electronic device in the vehicle and is provided on a face of the housing 55 opposite to the face where the optical section 51 is provided. The connector 53 is in an unbalanced state in the body 52. Therefore, the connector 53 is electrically connected to an integrated circuit via the balanced/unbalanced conversion circuit. The connector 53 is a coaxial connector including an inner terminal 53a and an outer terminal 53b. The inner terminal 53a and outer terminal 53b are electrically isolated from each other. The connector 53 and the electronic device in the vehicle are electrically connected via a coaxial cable 61.

The coaxial cable 61 is one of cables inserted into the opening 31 as shown in FIG. 2. One end of the coaxial cable 61 is connected to the connector 53. The coaxial cable 61 includes an inner conductor (not shown) connected to the inner terminal 53a and an outer conductor (not shown) connected to the outer terminal 53b. The inner conductor and outer conductor are electrically isolated from each other. The outer conductor is provided in such a way as to cover the inner conductor via an insulator in an extended direction of the coaxial cable 61.

The shielding member 8 shown in FIGS. 2, 3, and 5 is a member for blocking at least part of noise generated from the electronic component 7 from reaching the antenna 3. The shielding member 8 has a portion provided in the vicinity of the electronic component 7 and between the electronic component 7 and first antenna 21. More specifically, the shielding member 8 is provided on the base 5 and pad 6 and below the first antenna 21 in the antenna device 1 in the same manner as the electronic component 7. At least part of the shielding member 8 is in contact with the base 5. As a result, the shielding member 8 and base 5 are electrically connected to each other, and the shielding member 8 is grounded to the vehicle body which is ground via the base 5. The shielding member 8 includes a main portion 71, a lid portion 72, and a connection portion 73.

The main portion 71 is a portion that is located between the first antenna 21 and the body 52 of the electronic component 7 and covers at least part of the electronic component 7. The main portion 71 has an upper plate portion 71a located between the first antenna 21 and body 52 in the vertical direction, a pair of side plate portions 71b and 71c extending downward from both ends of the upper plate portion 71a in the width direction, and a back plate portion 71d extending downward from a forward end of the upper plate portion 71a. The upper plate portion 71a, side plate portions 71b and 71c, and back plate portion 71d each have a substantially rectangular shape, and are an integrated metal member. The metal member is a conductive member composed of metal or alloy.

Flange portions 74 and 75 extending outward from the main portion 71 in the width direction are provided at the lower ends of the side plate portions 71b and 71c respectively (also see FIG. 6). Flange portions 74 and 75 are provided with substantially rectangular through holes 74a and 75a extending in the vertical direction in a plan view, respectively. Fixing members 81 such as metal screws attached to the base 5 are inserted into the through holes 74a and 75a. The main portion 71 is fixed to the base 5 by screwing these fixing members 81 into screw holes of the base 5 via the respective through holes 74a and 75a. The main portion 71 is electrically connected to the base 5 via the fixing members 81 as the fixing members 81 have conductivity.

The lid portion 72 is a portion that seals a rear part that is open of the main portion 71. The lid portion 72 is fixed to the main portion 71 by, for example, a tape or an adhesive. The lid portion 72 is provided with an opening 72a for exposing at least the lens 54 of the optical section 51 from the shielding member 8. The state in which the lens 54 is exposed from the shielding member 8 is a state in which at least the lens 54 in the electronic component 7 is visible from the outside of the shielding member 8. As a result, as long as the lens 54 is exposed, the optical section 51 including the lens 54 may be located in a space defined by the shielding member 8 or may be located out of the space. In the present embodiment, the entire electronic component 7 including the optical section 51 is located in the space defined by the shielding member 8. In other words, the shielding member 8 is provided in such a way as to cover the entire electronic component 7. The opening 72a may be provided in such a way as not to obstruct the photographing range of the electronic component 7. That is, the shielding member 8 may be provided in such a way as not to obstruct photographing with the electronic component 7.

As shown in FIG. 6, the connection portion 73 is a portion that assists electrical connection between the connector 53 of the electronic component 7 and the coaxial cable 61. The connection portion 73 includes a cylindrical body 73a that is inserted into an opening 71e provided on the back plate portion 71d of the main portion 71 and a flange 73b provided at a middle portion of the body 73a. Both body 73a and flange 73b are, for example, metal members. The connection portion 73 is integrated with the main portion 71 and grounded by fixing the flange 73b to the back plate portion 71d. The connector 53 is inserted into one end of the connection portion 73, one end of the coaxial cable 61 is inserted into the other end of the connection portion 73, and the connector 53 and coaxial cable 61 are connected within the connection portion 73. The connection portion 73 is electrically connected to the outer terminal 53b of the connector 53 and the outer conductor at the one end of the coaxial cable 61. As a result, the outer terminal 53b and the outer conductor at the one end of the coaxial cable 61 are each grounded via the shielding member 8.

As described above, the insulator I is provided on the housing 55 of the electronic component 7. For example, the electronic component 7, main portion 71, and lid portion 72 are in contact with each other via the insulator I provided on the housing 55. Thus, the electronic component 7 is electrically connected and grounded to the shielding member 8 via only the outer terminal 53b of the connector 53.

According to the antenna device 1 according to the present embodiment described above, the shielding member 8 is provided to block at least part of noise generated from the electronic component 7 from reaching the antenna 3. Thereby, at least part of the noise generated from the electronic component 7 can be prevented from directly reaching the antenna 3. In addition, the electronic component 7 is electrically connected to the shielding member 8 grounded to the vehicle body which is the ground via only the outer terminal 53b. Consequently, the balanced state of the electronic component 7 is well maintained, and the waveform of a differential signal is less likely to be disturbed, so that the electronic component 7 is less likely to generate noise. In addition, one end of the coaxial cable 61 is connected to the connector 53 of the electronic component 7, and the outer conductor of the coaxial cable 61 is connected to the outer terminal 53b of the connector 53. Therefore, the outer conductor at the one end of the coaxial cable 61 is also electrically connected to the shielding member 8. Consequently, electric potential of the outer conductor at the one end of the coaxial cable 61 is less likely to fluctuate due to operation of the electronic component 7, so that noise generated from the electronic component 7 is less likely to be transmitted to the coaxial cable 61 and noise is less likely to be radiated from the coaxial cable 61. Thereby, it is also possible to prevent noise via the coaxial cable 61 from reaching the antenna 3. Thus, according to the antenna device 1 according to the present embodiment, it is possible to reduce an amount of noise generated from the electronic component 7 and also favorably block the noise generated from the electronic component 7 from reaching the antenna 3, so that it is possible to sufficiently reduce performance degradation of the antenna 3 even if the electronic component 7 is mounted.

In the present embodiment, the insulator I is provided on the housing 55 of the electronic component 7 and the insulator I is located between the housing 55 and shielding member 8. Consequently, for example, when the surface of the housing 55 is electrically connected to an integrated circuit, the surface can be prevented from being electrically connected to the shielding member 8 or the like in an unbalanced state. Thus, the balanced state of the electronic component 7 (particularly, the integrated circuit) is well maintained, so that an amount of noise generated from the electronic component 7 can be reduced.

The antenna device 1 comprises the base 5 configured to function as the ground for the antenna 3, and the shielding member 8 and base 5 are electrically connected to each other. Consequently, the shielding member 8 can be easily grounded via the base 5. Since the outer conductor at the one end of the coaxial cable 61 can be grounded in the vicinity of the electronic component 7, electric potential of the outer conductor at the one end can be stabilized more. Furthermore, since the electric potential of the entire outer conductor can be stabilized by grounding both ends of the outer conductor of the coaxial cable 61, generation of noise due to the coaxial cable 61 can be reduced.

The antenna device 1 comprises the fixing members 81 that fix the shielding member 8 to the base 5, and the shielding member 8 is electrically connected to the base 5 via the fixing members 81. Consequently, the fixing members 81 can perform both fixing the shielding member 8 to the base 5 and grounding the shielding member 8 via the base 5.

The shielding member 8 includes the upper plate portion 71a located between the electronic component 7 and antenna 3. Thereby, the noise blocking effect by the shielding member 8 can be obtained favorably.

The electronic component 7 is the camera including the optical section 51 including the lens 54 and the body 52 where the connector 53 and optical section 51 are provided, and the shielding member 8 is provided in such a way as to cover at least the body 52 and has the opening 72a for exposing the lens 54. Consequently, the shielding member 8 can favorably block the noise generated from the electronic component 7 without disturbing photographing with the camera which is the electronic component 7.

In the present embodiment, the antenna device 1 including the electronic component 7 that is a camera is mounted on the roof of a vehicle. Therefore, it is possible to favorably avoid an adverse effect on photographing with the electronic component 7 by dust and water splash from a road surface generated while the vehicle is running. In addition, since the electronic component 7 is mounted at a high position of the vehicle, it is possible to photograph farther than being mounted at a low position of the vehicle.

Figure 7A:
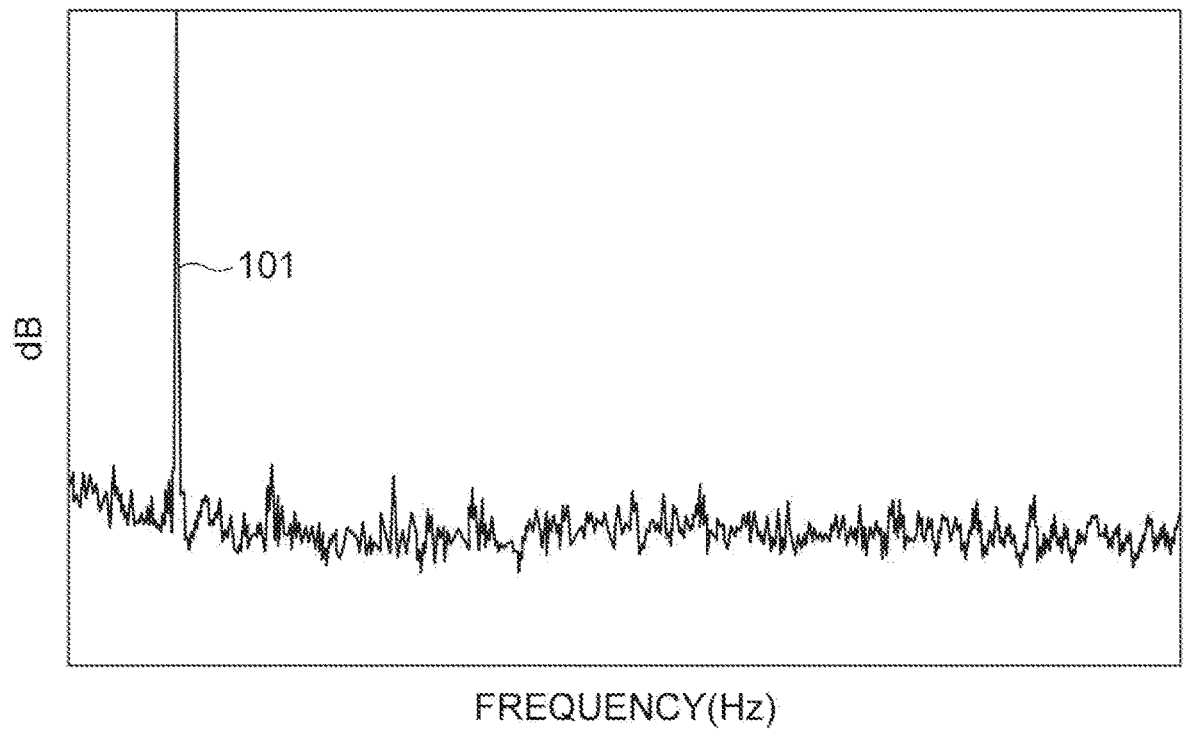
FIG. 7A is a diagram showing a measurement result of noise input into the antenna of the antenna device according to the embodiment.
Figure 7B:
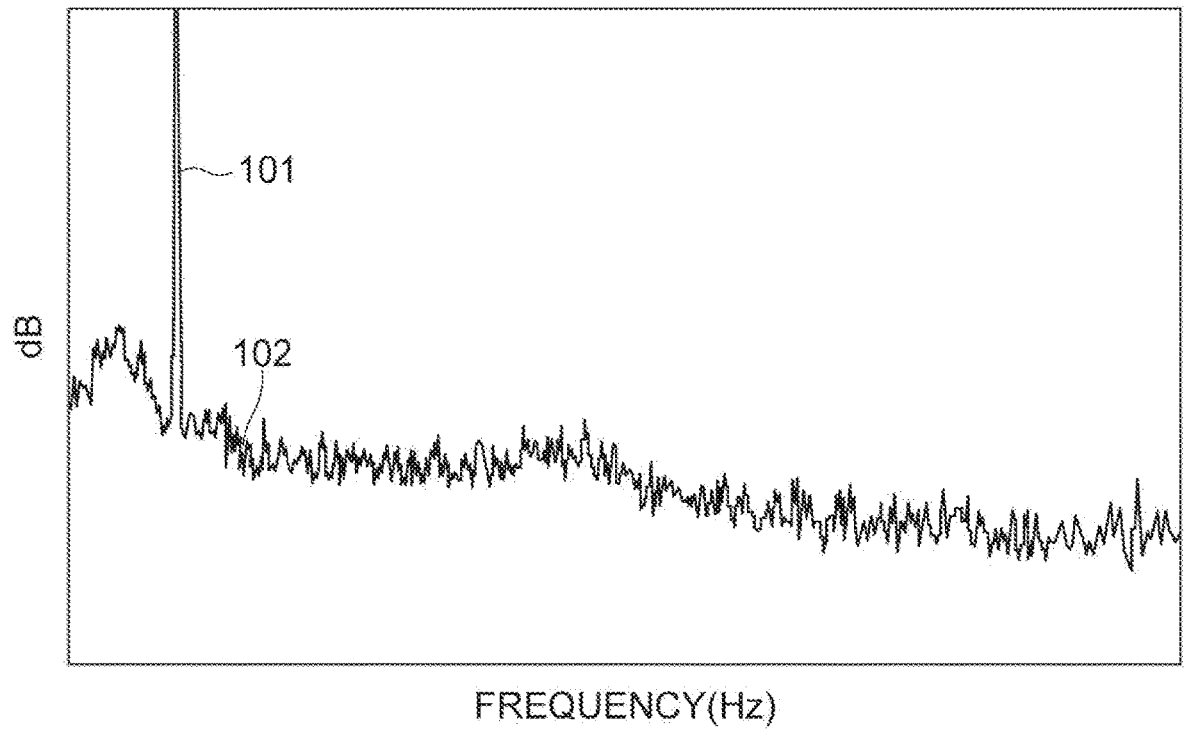
FIG. 7B is a diagram showing a measurement result of noise input into an antenna of an antenna device according to a comparative example 1.

The function and effect of the antenna device 1 according to the present embodiment will be further described below with reference to FIGS. 7 and 8. First, the function and effect of the state in which the electronic component 7 is electrically connected to the grounded shielding member 8 via only the outer terminal 53*b* in the antenna device 1 will be described with reference to FIG. 7A and FIG. 7B. FIG. 7A is a diagram showing a measurement result of noise input into the antenna 3 of the antenna device 1 according to the present embodiment, and FIG. 7B is a diagram showing a measurement result of noise input into an antenna of an antenna device according to a comparative example 1. In FIG. 7A and FIG. 7B, the abscissa axis represents frequency and the ordinate axis represents measured noise intensity.

In the comparative example 1, unlike the present embodiment, not only the electronic component 7 is electrically connected to the shielding member 8 via the outer terminal 53*b*, but also the surface of the housing 55 and the shielding member 8 are directly in contact with each other without an insulator or the like. That is, in the comparative example 1, the electronic component 7 is electrically connected to the shielding member 8 via both outer terminal 53*b* and place other than the outer terminal 53*b*.

While only a sharp peak 101 was recognized in FIG. 7A, in FIG. 7B a broad peak 102 overlapping with the peak 101 was recognized in addition to the peak 101. Consequently, it is said that the electronic component 7 is less likely to generate noise by electrically connecting the electronic component 7 to the shielding member 8 grounded via only the outer terminal 53*b* like the present embodiment.

It is inferred that the peak 102 recognized in the comparative example 1 was generated because the balanced state of the electronic component 7 was broken by grounding the electronic component 7 via a plurality of places. When the balanced state of the electronic component 7 breaks down, the waveform of the differential signal flowing through the coaxial cable 61 and electronic component 7 is disturbed, and the electronic component 7 becomes likely to generate noise. It is inferred that the peak 102 is recognized in the comparative example 1 because the generated noise transmits to the coaxial cable 61 and from the coaxial cable 61 to the antenna 3.

Figure 8A:
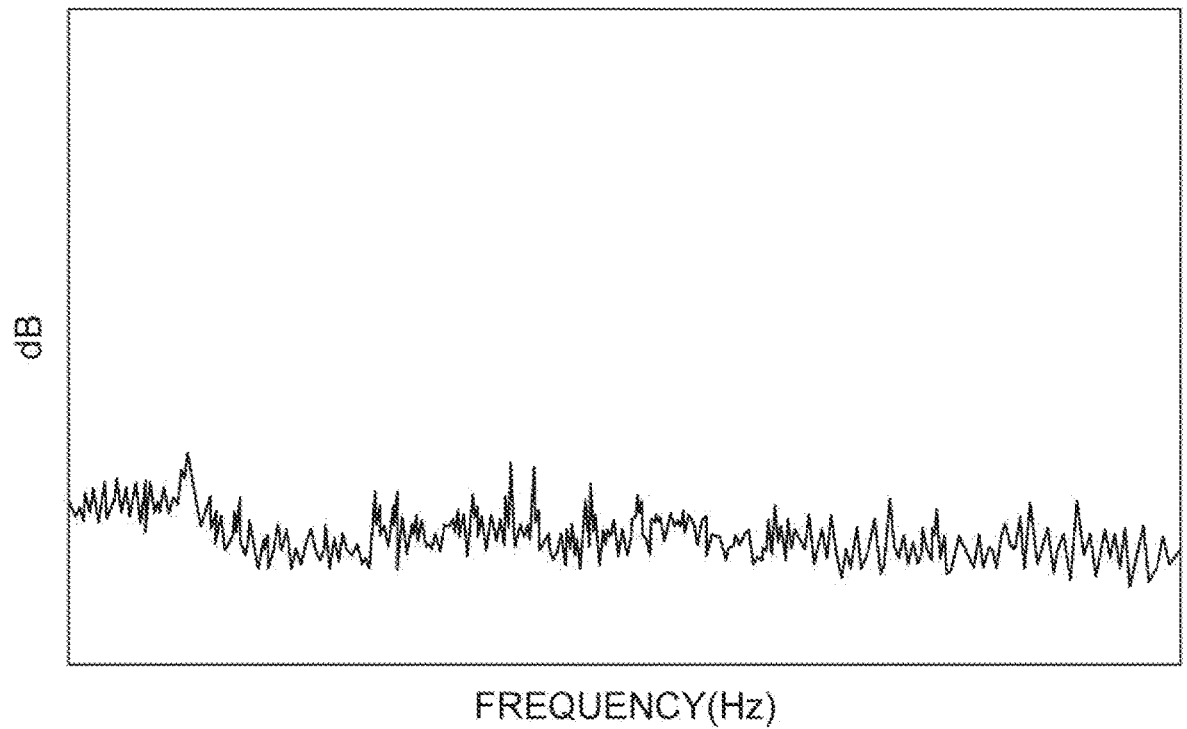
FIG. 8A is a diagram showing a measurement result of noise input into the antenna of the antenna device according to the embodiment.
Figure 8B:
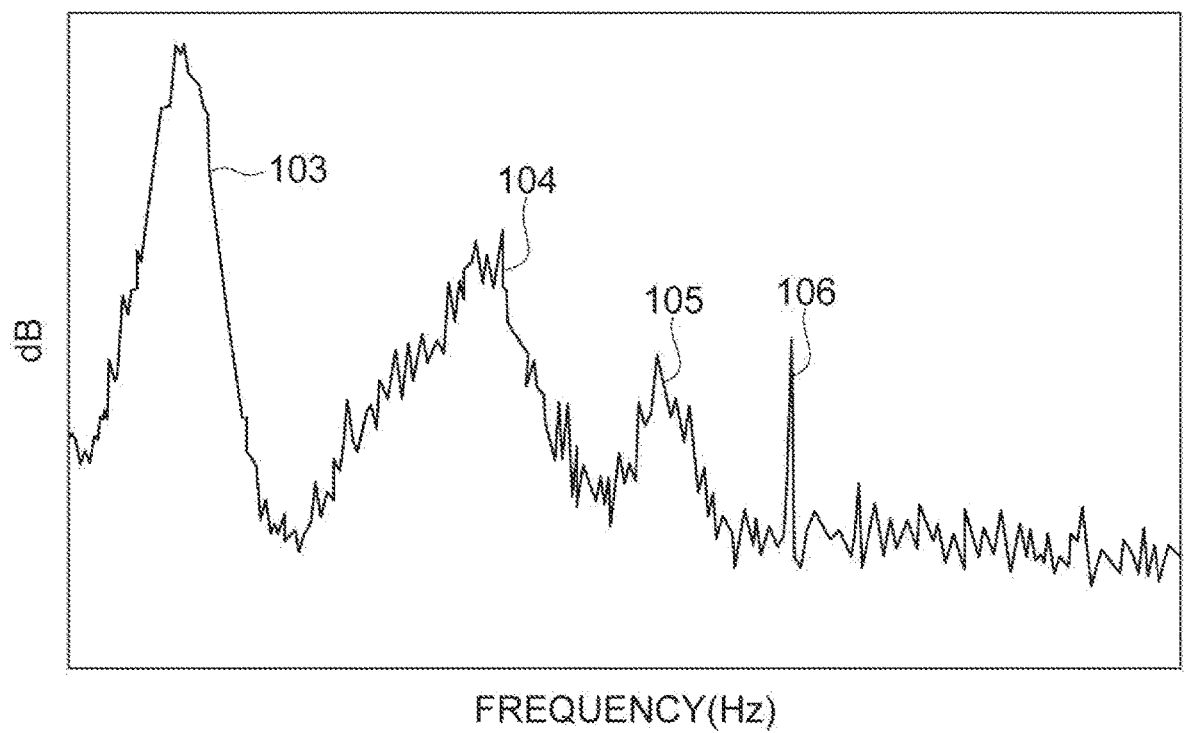
FIG. 8B is a diagram showing a measurement result of noise input into an antenna of an antenna device according to a comparative example 2.

Next, the function and effect of stabilizing the potential of the outer conductor at one end of the coaxial cable 61 (specifically, the end of the coaxial cable 61 at the electronic component 7 side) in the antenna device 1 will be described with reference to FIG. 8A and FIG. 8B. FIG. 8A is a diagram showing a measurement result of noise input into the antenna of the vehicle-mounted antenna device according to the present embodiment, and FIG. 8B is a diagram showing a measurement result of noise input into an antenna of a vehicle-mounted antenna device according to a comparative example 2. In FIG. 8A and FIG. 8B, the abscissa axis represents frequency and the ordinate axis represents measured noise intensity.

In the comparative example 2, unlike the present embodiment, the connection portion 73 and main portion 71 in the shielding member 8 are electrically insulated from each other. Consequently, the outer terminal 53*b* of the connector 53 of the electronic component 7 and the outer conductor at the one end of the coaxial cable 61 are not grounded to the ground via the shielding member 8.

While noticeable peaks were not recognized in FIG. 8A, a plurality of peaks 103 to 106 were recognized in FIG. 8B. Consequently, it can be said that the electronic component 7 is less likely to generate noise by grounding the outer terminal 53*b* of the connector 53 of the electronic component 7 and the outer conductor at the one end of the coaxial cable 61 via the shielding member 8 like the present embodiment.

Figure 9A:
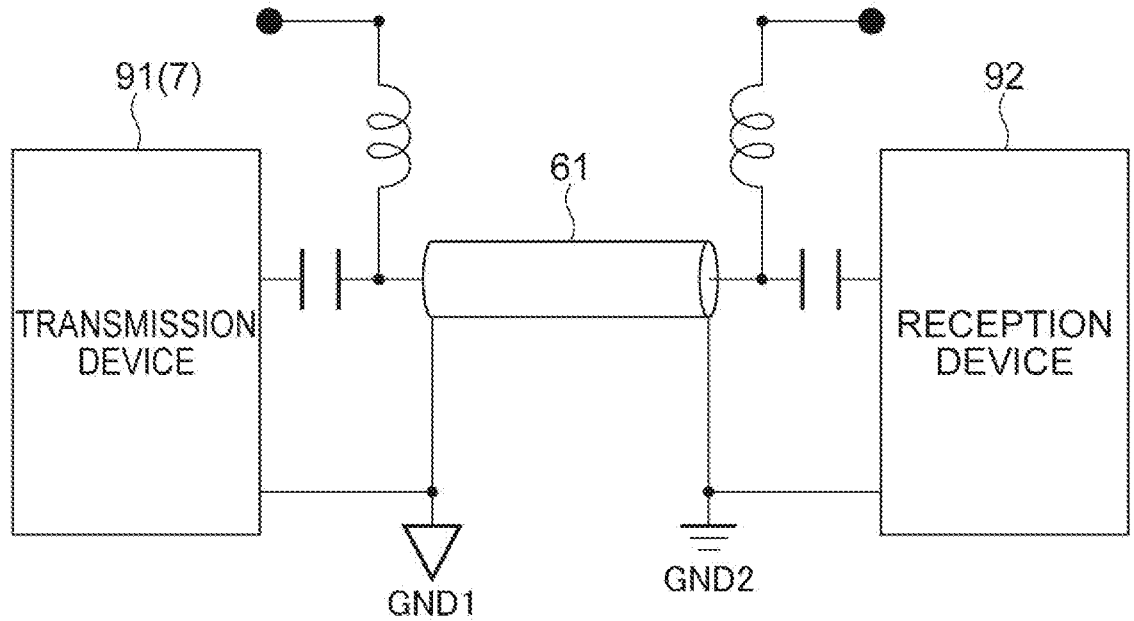
FIG. 9A is a schematic diagram showing a signal transmission circuit including an electronic component and a coaxial cable according to the comparative example 2.
Figure 9B:
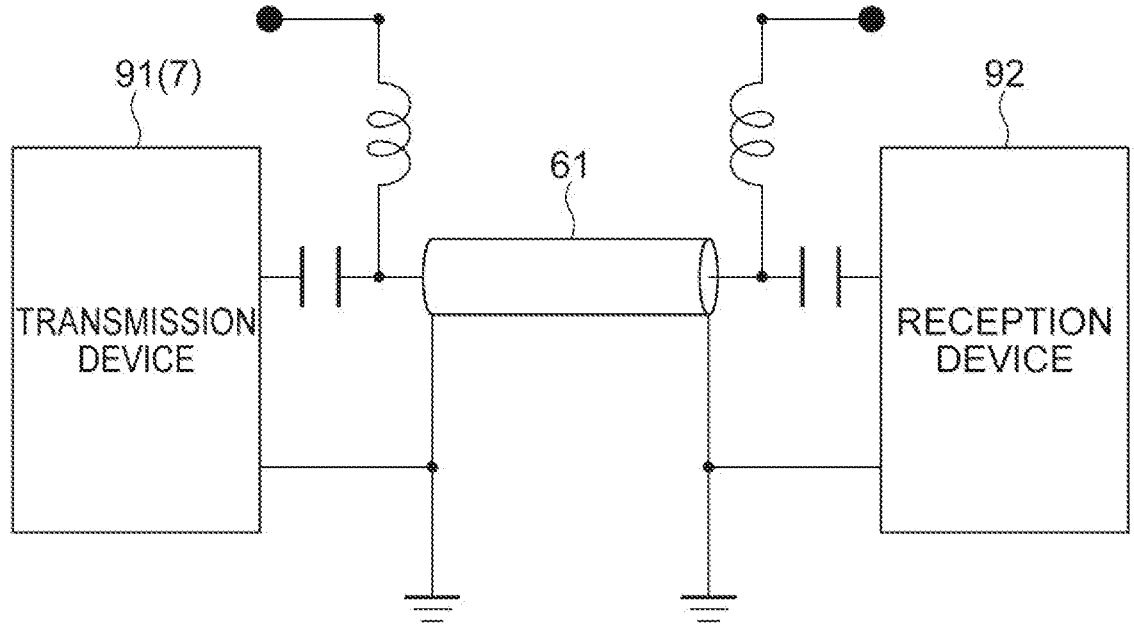
FIG. 9B is a schematic diagram showing a signal transmission circuit including the electronic component and a coaxial cable according to the embodiment.

Here, the function and effect by stabilizing the potential of the outer conductor at one end of the coaxial cable 61 will be described in more detail with reference to FIG. 9A and FIG. 9B. FIG. 9A is a schematic diagram showing a signal transmission circuit including the electronic component and coaxial cable according to the comparative example 2, and FIG. 9B is a schematic diagram showing a signal transmission circuit including the electronic component 7 and coaxial cable 61 according to the present embodiment. A transmission device 91 shown in FIG. 9A and FIG. 9B corresponds to the electronic component 7. A reception device 92 shown in FIG. 9A and FIG. 9B corresponds to the electronic device in the vehicle. The reception device 92 is grounded to the ground which is the vehicle body in any of FIG. 9A and FIG. 9B. Thus, in the comparative example 2, the outer terminal 53*b* and one end of the outer conductor of the coaxial cable 61 are grounded via the reception device 92.

As described above, in the comparative example 2, the outer conductor at the one end of the coaxial cable 61 is not grounded via the shielding member 8. In this case, the potential of the outer conductor at the one end tends to fluctuate. Specifically, as shown in FIG. 9A, ground potential GND1 (that is, potential of the outer conductor at the one end of the coaxial cable 61) of the transmission device 91 is influenced by voltage supplied when the transmission device 91 (electronic component 7) is operated, and tends to be different from ground potential GND2 of the reception device 92. The difference between the ground potentials GND1 and GND2 makes it easier for noise to be generated in the electronic component 7 and makes it easier for the noise to transmit to the coaxial cable 61.

On the other hand, in the present embodiment, the outer terminal 53*b* of the connector 53 and the outer conductor at the one end of the coaxial cable 61 are grounded to the vehicle body which is the ground via the shielding member 8. In this case, as shown in FIG. 9B, the ground potential of the reception device 92 and the ground potential of the transmission device 91 can be favorably common. As a result, noise does not easily occur in the electronic component 7. In addition, the potential of the outer conductor of the coaxial cable 61 is stabilized, which makes it less likely for noise to transmits to the coaxial cable 61, and makes it less likely for the noise to be radiated from the coaxial cable 61. Thus, noise via the coaxial cable 61 can be prevented from reaching the antenna 3.

Antenna devices according to the invention are not limited to the above embodiment, and other various modifications are possible. For example, in the above embodiment, the entire electronic component 7 including the optical section 51 is located in the space defined by the shielding member 8, but the invention is not limited to this. For example, part of the electronic component 7 may be located outside the space defined by the shielding member 8. As a specific example, the optical section 51 may protrude from the shielding member 8 via the opening 72a.

Figure 10:
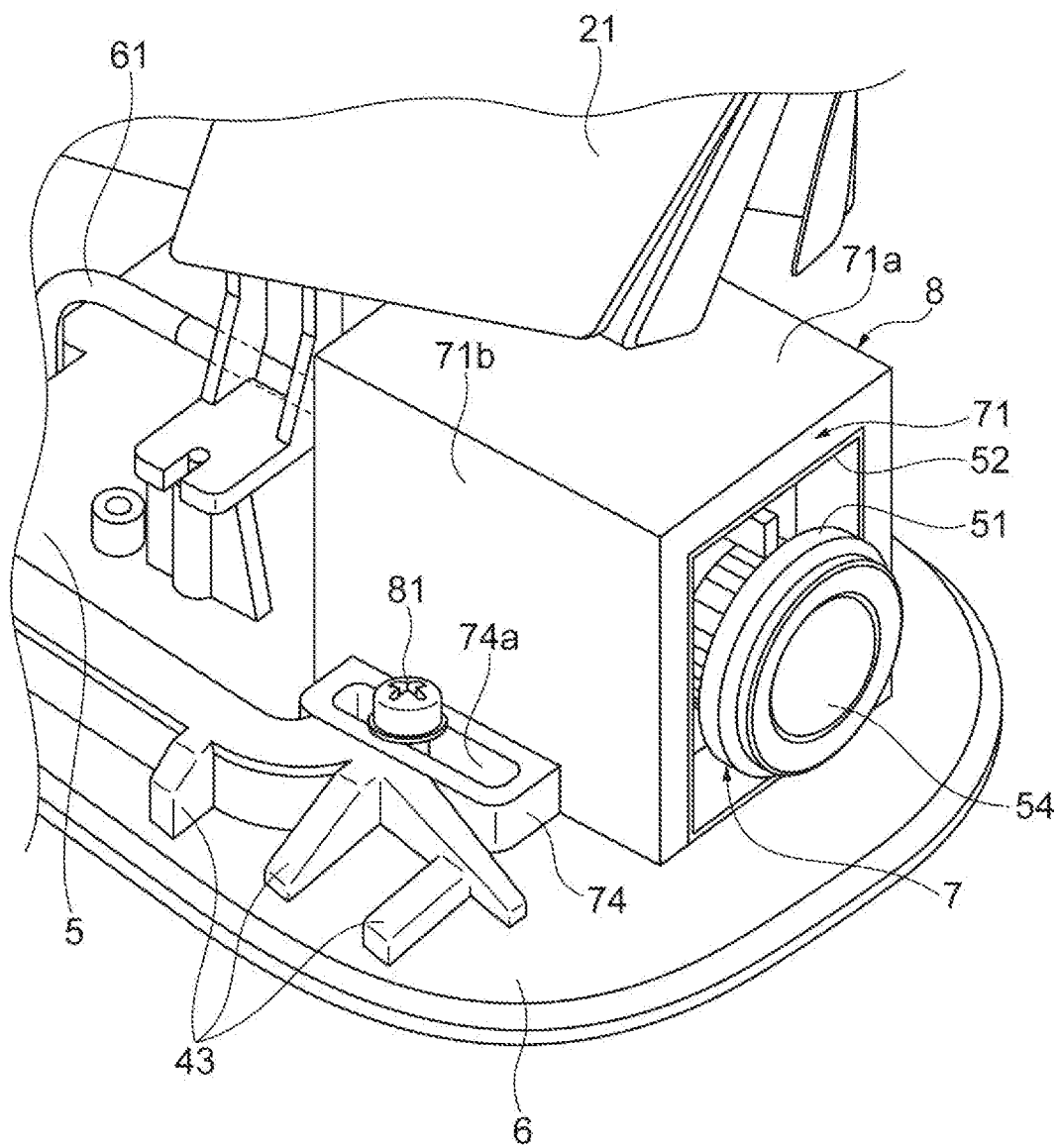
FIG. 10 is an enlarged rear side perspective view of an antenna device according to a modification of the embodiment.

FIG. 10 is an enlarged rear side perspective view of an antenna device according to a modification of the above embodiment. As shown in FIG. 10, the shielding member 8 may not include the lid portion 72. In other words, the optical section 51 of the electronic component 7 and the face of the body 52 where the optical section 51 is provided may not be covered with the shielding member 8. Even in such a modification, the same function and effect as those of the present embodiment can be obtained.

In the above embodiment and above modification, the shielding member 8 includes the main portion 71 and lid portion 72 separate from each other, but the shielding member 8 may be a member into which the main portion and lid portion are integrated.

In the above embodiment and above modification, the antenna device 1 may be not provided with the circuit board 4. In this case, the antenna 3 may be electrically connected to the electronic device in the vehicle via cable or the like.

In the above embodiment and above modification, the base 5 may be a resin mount. In this case, at least part of the base 5 is provided with a conductive region made of metal or the like. The conductive region is electrically connected to the vehicle body to function as the ground for the antenna 3 and is electrically connected to the shielding member 8.

In the above embodiment and above modification, the position of the electronic component 7 in the antenna device 1 is not limited. The electronic component 7 may be provided, for example, at the front of the antenna device 1 rather than below the antenna 3. The electronic component 7 may not be covered with the cover 2. That is, at least part of the electronic component 7 may be provided in such a way as to expose from the cover 2.

Figure 11:
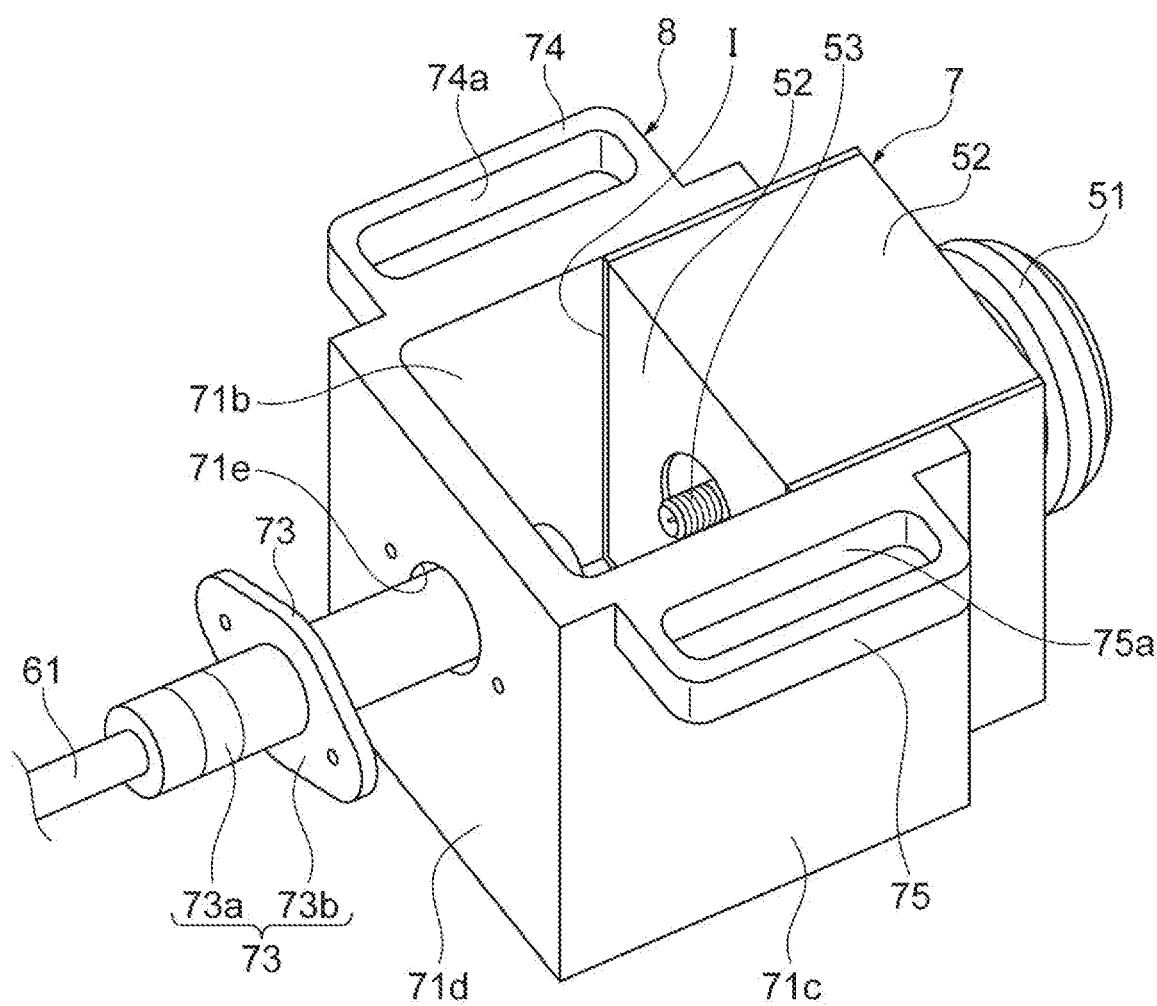
FIG. 11 is a diagram illustrating another example of an insulator covering the electronic component.

In the above embodiment and above modification, of the surface of the housing 55, the four faces other than the face where the optical section 51 is provided and the face where the connector 53 is provided are covered with the filmy insulator I, but the invention is not limited to this. For example, at least any of the face where the optical section 51 is provided and the face where the connector 53 is provided may be covered with the insulator I. Alternatively, of the surface of the housing 55, the face not facing the shielding member 8 may not be covered with the insulator I in addition to the face where the optical section 51 is provided and the face where the connector 53 is provided. In this case, for example, as shown in FIG. 11, the insulator I may cover three faces of the surface of the housing 55. Part of the insulator I may be provided with a hole or the like. That is, the insulator I may only cover part of each face.

In the above embodiment and above modification, the surface of the housing 55 may not be provided with the insulator I. In this case, for example, a gap is provided between the housing 55 and shielding member 8 in order to prevent conduction between the surface of the housing 55 and the shielding member 8. In this case, air located between the housing 55 and shielding member 8 functions as an insulator. While the insulator I is provided on a part of the surface of the housing 55, a gap may be provided between another part of the housing 55 and the shielding member 8.

In the above embodiment and above modification, the electronic component 7 is not limited to a camera. For example, the electronic component may be a light-emitting diode. In other words, the electronic component 7 only needs to be a balanced circuit.

In the above embodiment and above modification, the shielding member 8 may not be in contact with the base 5.

For example, the shielding member 8 may be in contact with only the pad 6. In this case, the shielding member 8 and base 5 only need their conduction to be secured by the fixing members 81.

Figure 12:
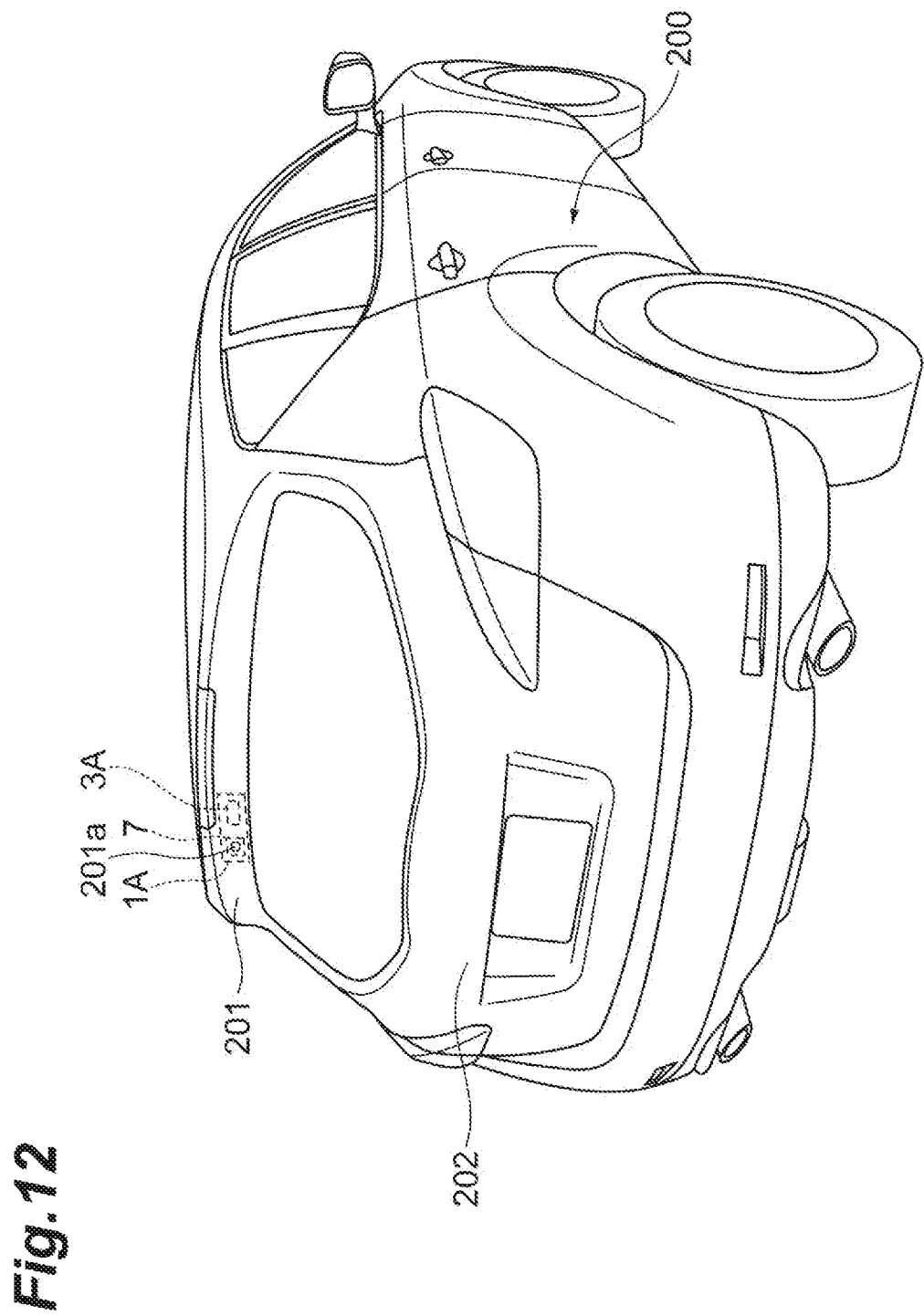
FIG. 12 is a diagram showing another attachment example of the antenna device.

In the above embodiment and above modification, the antenna device 1 is a vehicle-mounted antenna device mounted on the roof of a vehicle, but it is not limited to this. FIG. 12 is a diagram showing another attachment example of the antenna device. As shown in FIG. 12, an antenna device 1A may be a device (spoiler antenna) attached to a spoiler 201 provided at an upper rear end of a vehicle body 200. The antenna device 1A includes at least an antenna 3A and the electronic component 7 which is a camera. The electronic component 7 can photograph a backward direction of the vehicle via an opening 201a provided on the spoiler 201. In this case, the antenna device 1A may not be a shark fin antenna. If the spoiler 201 is not mounted on the vehicle body 200, for example, the antenna device may be attached to a back door 202, or may be attached to a spoiler below the back door.

REFERENCE SIGNS LIST 1, 1A Antenna Device (Vehicle-Mounted Antenna Device)
2 Cover
3 Antenna
4 Circuit Board
5 Base
6 Pad
7 Electronic Component
8 Shielding Member
12 Opening
51 Optical Section
52 Body
53 Connector (Coaxial Connector)
53a Inner Terminal
53b Outer Terminal
54 Lens
55 Housing
61 Coaxial Cable
71 Main Portion
71a Upper Plate Portion
71d Back Plate Portion
72 Lid Portion
72a Opening
81 Fixing Member
I Insulator

The invention claimed is:

1. A vehicle-mounted antenna device comprising:
   an antenna;
   an electronic component electrically isolated from the antenna, the electronic component comprising a coaxial connector including an inner terminal and an outer terminal;
   a coaxial cable with one end connected to the coaxial connector; and
   a shielding member grounded to a vehicle body being ground, the shielding member being configured to block at least part of noise generated from the electronic component from reaching the antenna,
   the coaxial cable including an inner conductor connected to the inner terminal and an outer conductor connected to the outer terminal, and
   the electronic component being electrically connected to the shielding member via only the outer terminal.

2. The vehicle-mounted antenna device according to claim 1, further comprising an antenna base configured to function as ground for the antenna,
wherein the shielding member and the antenna base are electrically connected to each other.

3. The vehicle-mounted antenna device according to claim 2, further comprising
a fixing member configured to fix the shielding member to the antenna base,
the shielding member being electrically connected to the antenna base via the fixing member.

4. The vehicle-mounted antenna device according to claim 1, wherein
the shielding member has a portion located between the electronic component and the antenna.

5. The vehicle-mounted antenna device according to claim 1, wherein
the electronic component is a camera including a body and an optical section including a lens,
the body includes the coaxial connector and the optical section, and
the shielding member covers at least the body and has an opening for exposing the lens.

6. The vehicle-mounted antenna device according to claim 2, wherein
the shielding member has a portion located between the electronic component and the antenna.

7. The vehicle-mounted antenna device according to claim 3, wherein
the shielding member has a portion located between the electronic component and the antenna.

8. The vehicle-mounted antenna device according to claim 2, wherein
the electronic component is a camera including a body and an optical section including a lens,
the body includes the coaxial connector and the optical section, and
the shielding member covers at least the body and has an opening for exposing the lens.

9. The vehicle-mounted antenna device according to claim 3, wherein
the electronic component is a camera including a body and an optical section including a lens,
the body includes the coaxial connector and the optical section, and
the shielding member covers at least the body and has an opening for exposing the lens.

10. The vehicle-mounted antenna device according to claim 4, wherein
the electronic component is a camera including a body and an optical section including a lens,
the body includes the coaxial connector and the optical section, and
the shielding member covers at least the body and has an opening for exposing the lens.

* * * * *